May 29, 1923.

A. A. RIGNY 1,457,123

COMBUSTION ENGINE

Filed Nov. 22, 1921

Inventor
Arthur A. Rigny
By his Attorney
W. T. Criswell.

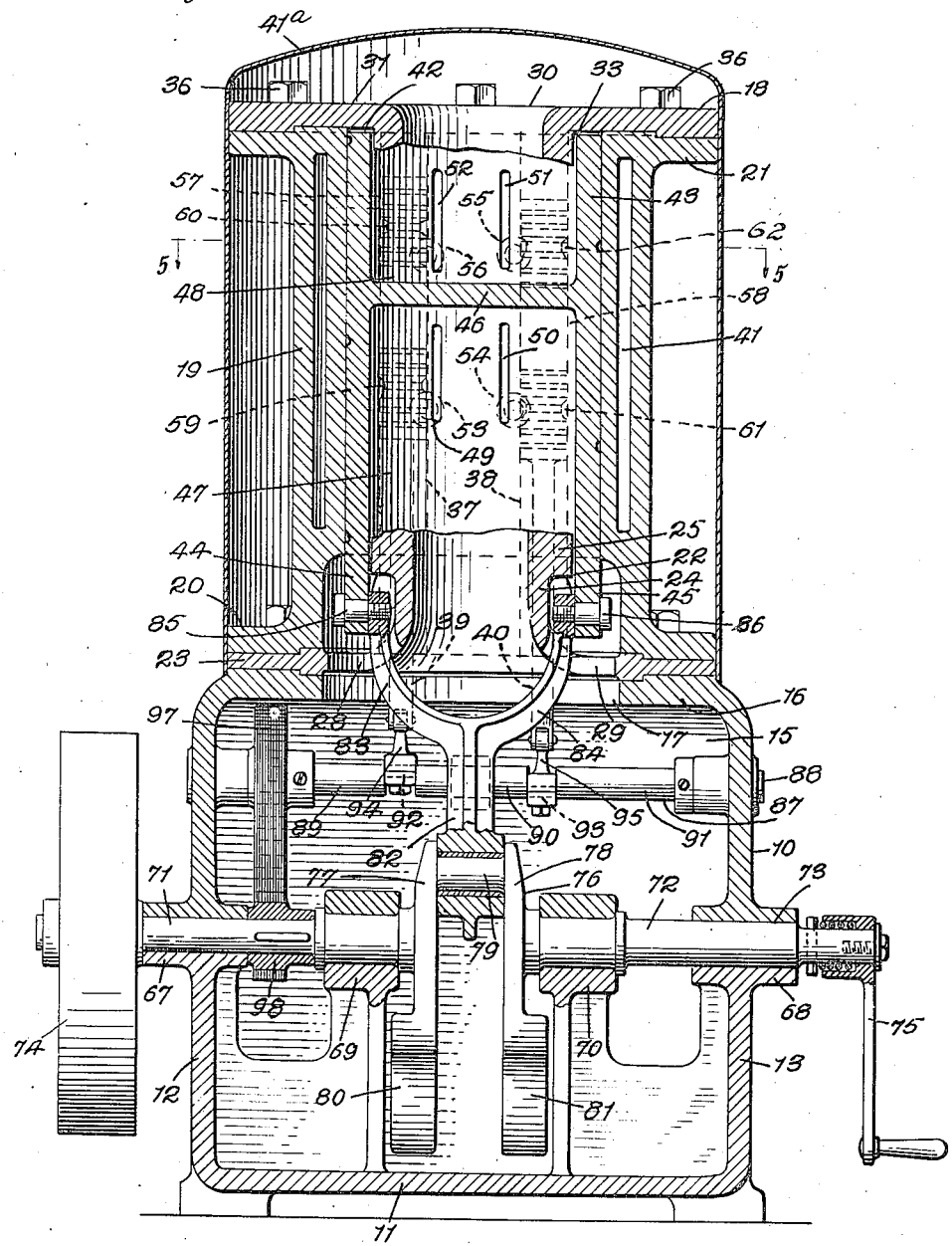

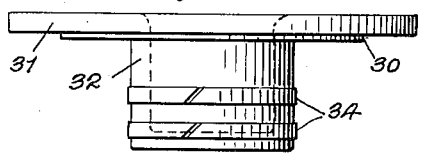
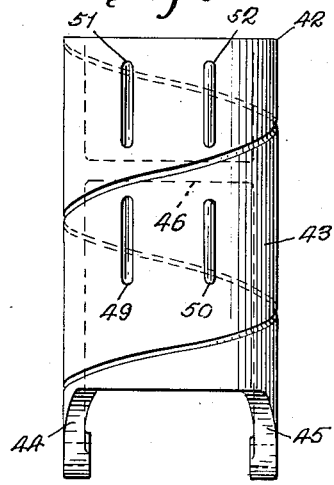
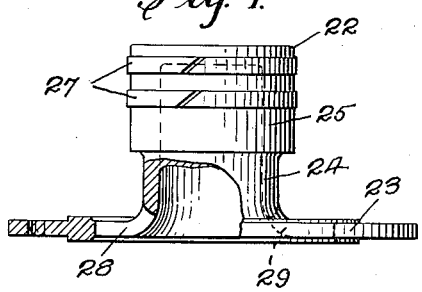
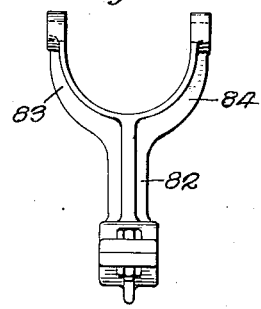
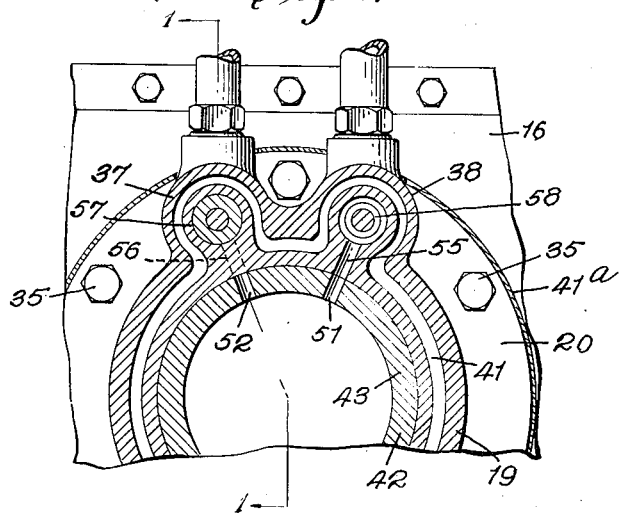
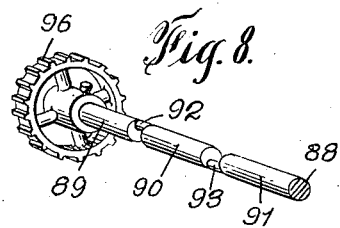

Patented May 29, 1923.

1,457,123

UNITED STATES PATENT OFFICE.

ARTHUR A. RIGNY, OF MILFORD, PENNSYLVANIA.

COMBUSTION ENGINE.

Application filed November 22, 1921. Serial No. 517,001.

*To all whom it may concern:*

Be it known that I, ARTHUR A. RIGNY, a citizen of the United States, and a resident of Milford, in the county of Pike and State of Pennsylvania, have invented certain new and useful Improvements in a Combustion Engine, of which the following is a full, clear, and exact specification.

This invention relates to a class of engines adapted to be driven by firing compressed volatile fluid.

My invention has for its object primarily to provide a combustion engine designed to be employed for propelling automotive vehicles, air ships, aeroplanes, boats and the like, and which is of a type that will permit of the use of a single cylinder form of engine of a power generating efficiency equal to that of the usual two cylinder type of engine, thereby enabling a great saving of weight to be made as well as having the advantage of occupying a limited area of space. The invention consists mainly of a cylinder having in its lower part an inlet and outlet and also in the upper part of the cylinder is an inlet and an outlet. In the cylinder is a reciprocable piston having a crosshead arranged so that lower and upper compression chambers are provided in the cylinder, and the lower inlet and outlet leads into the lower compression chamber, while the upper inlet and outlet lead into the upper compression chambers so that gaseous fuel may be admitted into each compression chamber for being exploded and the products of combusted fuel discharged from each compression chamber. Alternately reciprocable in the cylinder are two valves for simultaneously controlling with each stroke of each valve the feed of the fuel to one chamber and the exhaust of the combusted fuel products from the other chamber. The power from each up stroke and from each down stroke of the piston is thereby utilized, and by employing the two valves the feed and exhaust of the fuel to and from the compression chambers are accomplished in a manner so that the power produced by a single cylinder form of my engine is approximately equal to the power produced by ordinary engines operating two cylinders.

Other objects of the invention are to provide means operative by the piston when reciprocated to drive a shaft whereby the power of the engine may be used for propelling purposes; to provide mechanism which is operated with the driving of the shaft for alternately reciprocating the valves; and to provide an efficient and durable engine which may be made in any suitable size as well as being made of types having a plurality of cylinders.

With these and other objects in view, the invention will be hereinafter more fully described with reference to the accompanying drawings forming a part of this specification in which similar characters of reference indicate corresponding parts in all the views, and will then be pointed out in the claims at the end of the description.

In the drawings, Figure 1 is a detail sectional view taken on the line 1—1 of Fig. 5 of one form of combustion engine embodying my invention.

Fig. 2 is a detail sectional view, partly broken away, taken on the line 2—2 of Fig. 1.

Fig. 3 is an elevation of a form of the head used on the upper end of the cylinder of the engine.

Fig. 4 is an elevation, partly broken away, of the form of head used on the lower end of the cylinder.

Fig. 5 is a fragmentary view, showing a detail section taken of the line 5—5 of Fig. 2.

Fig. 6 is an elevation of the form of piston employed in the engine.

Fig. 7 is a reduced elevation of the form of crank used with the piston, and

Fig. 8 is a reduced perspective view of the form of crank shaft used for operating the valves of the engine.

Figure 1:
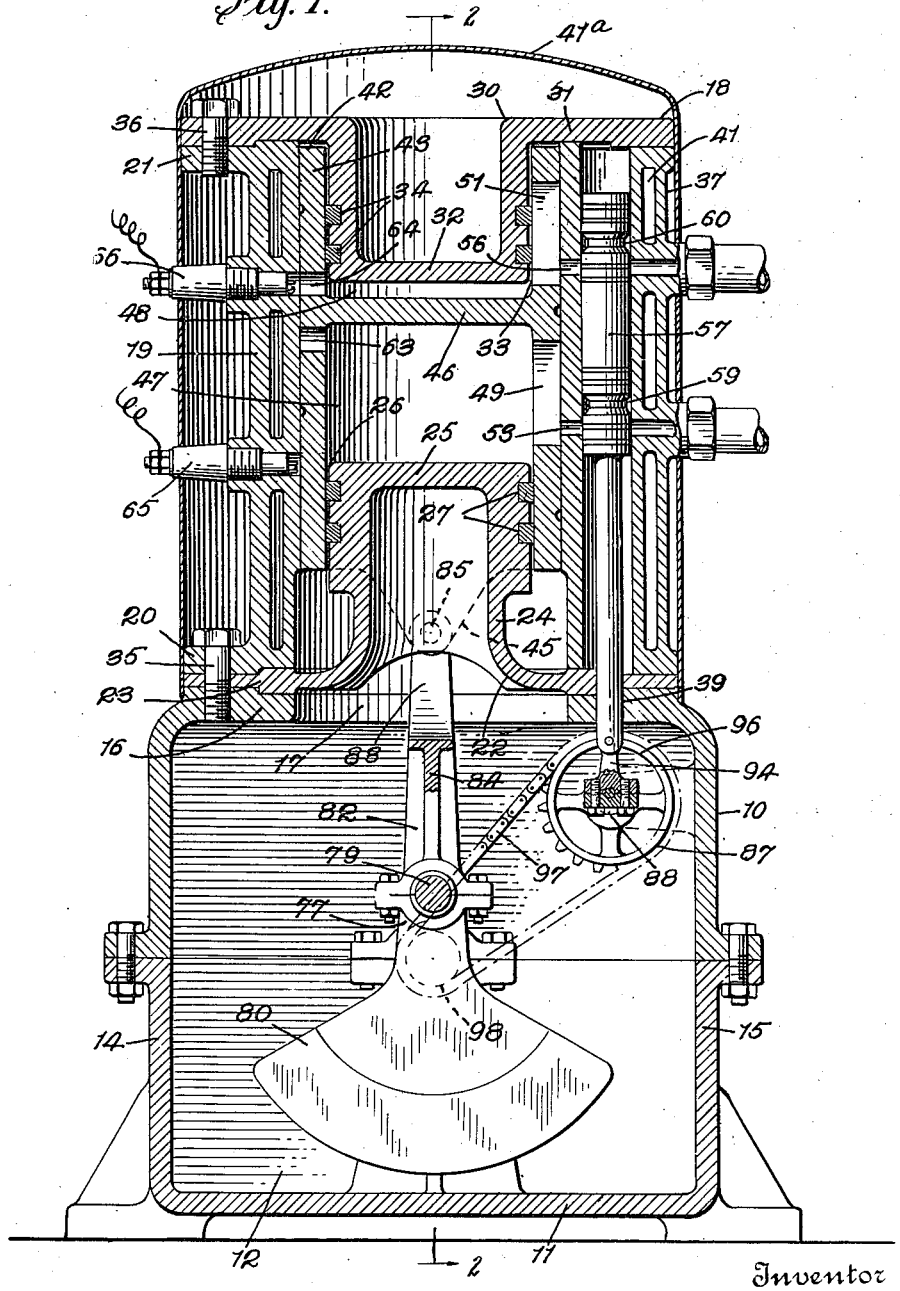

The engine has a crank pit or casing 10 which may be substantially rectangular to provide a bottom wall 11, side walls 12, 13, end walls 14, 15 and a top wall 16 having in its central part a large opening, as 17. On top of the crank pit 10 is a cylinder 18 constructed with an annular or cylindrical wall 19 of a size so that the diameter of its interior is approximately similar to the size of the opening 17 of the upper wall 16 of the crank pit. On the lower edge of the annular wall 19 of the cylinder may be an outwardly protruding annular flange 20, and extending outwardly from the upper end of the wall 19 may be another annular flange 21. Beneath the lower end of the annular wall 19 of the cylinder is a bottom member, as 22, formed with an annular flange 23. On the inner edge of the annular flange 23 of the bottom member 22 is a hollow annular neck, as 24, having on its upper end a hollow head, as 25, of preferably a circular cap shape. The neck 24 and head 25 protrude a distance upwardly in the annular wall 19 of the cylinder, and the head and neck are of diameters so that they are spaced from the wall 19 to provide an annular groove 26 in communication with the lower end of the interior of the cylinder. On the exterior of the head 25 of the bottom member 22 may be spaced packing rings, as 27, and in opposite parts of the bottom member at the juncture of the neck 24 with the flange 23 are two openings, as 28 and 29. On the upper end of the annular wall 19 of the cylinder 18 is a top member 30 having an annular flange 31 disposed upon the upper edge of the wall 19, and on the inner edge of the flange 31 is a hollow head 32 in the form of an inverted circular cap projecting downwardly into the interior of the cylinder so that its lower end is spaced a considerable distance above the upper end of the head 25 of the bottom member 23 of the cylinder. The head 32 is of a diameter so that it is spaced from the wall 19 of the cylinder to provide an annular groove 33 in communication with the upper end of the interior of the cylinder, and on the exterior of the head 32 may also be spaced packing rings 34. The annular flange 23 of the bottom member 22 and the annular flange 20 of the wall 19 of the cylinder may be bolted or otherwise fastened, as at 35, to the top wall 16 of the crank pit 10 so that the openings 28 and 29 of the bottom member 22 of the cylinder lead into the opening 17 of the top wall of the crank pit. The annular flange 31 of the top member 30 may be bolted or otherwise fastened, as at 36, to the flange 21 of the wall 19 of the cylinder, and integrally formed on the exterior of the wall 19 of the cylinder are two closely spaced valve casings 37 and 38 both of which are somewhat tubular in forms with their upper ends being closed by the annular flange 31 of the top member 30 of the cylinder. The lower ends of the tubular valve casings lead through registered openings, such as 39, provided in the flange 23 of the bottom member 22 of the cylinder and in the top wall 16 of the crank pit 10. The annular wall 19 of the cylinder and the outer wall of the valve casings 37 and 38 may be hollow, as at 41, for holding water to provide a cooling jacket, and inclosing the entire cylinder above the crank pit 10 may be an outer jacket or shell, as 41ª.

Within the cylinder 18 of the engine is a piston 42 which is reciprocable upwardly and downwardly toward and from the opening 17 of the top of the crank pit 10. The piston 42 has an annular or cylindrical wall 43 of a length so that its ends are movable in the annular grooves 26 and 33 communicating with the interior of the cylinder 18, and on opposite parts of the lower end of the wall 43 of the piston may be two lugs or extensions 44 and 45 both substantially V-shaped and disposed so that their apices protrude toward the openings 28 and 29 of the flange 23 of the bottom member 22 of the cylinder 18. Across the interior of the cylindrical wall 43 of the piston 42 is a head or partitioning plate 46 which divides the interior of the cylinder 18 into a lower compression chamber 47 and an upper compression chamber 48. As shown, these compression chambers are also provided within the wall 43 of the piston 42, one between the crosshead 46 and head 25 of the bottom member 22 of the cylinder and the other between the crosshead 46 and the head 32 of the top member 30 of the cylinder. The crosshead 46 of the piston is also arranged so that when the piston is reciprocated its maximum distance downwardly in the cylinder the crosshead will be closely spaced from the head 25 of the bottom member 22 of the cylinder and when the piston is reciprocated its maximum distance upwardly the crosshead will be closely spaced from the head 32 of the top member 30 of the cylinder, in order that combustible gaseous fuel may be effectually compressed for being exploded, as is incident to the operation of the usual combustion engines. In the wall 43 of the piston 42 below the crosshead or partition 46 are an inlet 49 and an outlet 50 which is spaced from the inlet and in this wall above the crosshead are also an inlet 51 and an outlet 52 which is spaced from the inlet 51. All of these inlets and outlets may be in the forms of elongated vertically disposed slots. Leading through the wall of the valve casing 37 into and out of the interior of this casing as well as leading into the lower compression chamber 47 through the inlet and outlet 49 and 50 of the piston 42 are an inlet 53 and an outlet 54 for admitting explosive gaseous fuel into the lower compression chamber and for exhausting the lower chamber of the fuel products following their combustion. An inlet 55 and an outlet 56 also lead through the wall of the valve casing 38 into and out of the interior of the casing as well as leading through the inlet and outlet 51 and 52 of the piston 42 for admitting explosive gaseous fuel into the upper compression chamber and for exhausting the upper chamber of the fuel products after their combustion. The inlets and outlets 53, 54, 55 and 56 may be in forms of circular passages so that the admission of fuel and the discharge of combustible fuel products from the lower and upper compression chambers may be properly regulated. The feeding and exhausting process is controlled by two valves, as 57 and 58, which are alternately reciprocable in the valve casings 37 and 38.

Both of the valves 57 and 58 may be in the forms of rod plungers of sizes for being freely reciprocated in the interiors of the casings 37 and 38 as well as being of lengths so that they extend across all of the inlets and outlets 53, 54, 55, 56 of the valve casings, while their lower ends are movably disposed through the holes or openings 39 and 40 of the cylinder so that the lower ends of the valves protrude into the crank pit 10. In spaced parts of the periphery of the plunger valve 57 are two annular grooves 59, and 60 and in spaced parts of the periphery of the plunger valve 58 are also two annular grooves 61, 62. The grooves of one of the valves are provided with relation to the grooves of the other valve so that with the alternate reciprocation of the valves the grooves of one valve will register with one of the inlets and with one of the outlets of the piston 42 under and above its crosshead 46 for simultaneously admitting fuel into one compression chamber and exhausting the combustible fuel products from the other compression chamber. The second inlet and second outlet of the compression chambers will then be closed by the other valve which when subsequently reciprocated will cause its grooves to register with the second inlet and with the second outlet of the piston under and above its crosshead 46 for admitting fuel into one of the compression chambers simultaneously with exhausting the combusted fuel products from the other chamber. Thus with the reciprocation of the piston it will make four strokes with the alternate single strokes of the valves 57 and 58. In the wall of the piston 42 under its crosshead 46 is a hole or opening 63, and also in the wall of the piston above the crosshead is another hole or opening 64. With each upstroke and each downstroke of the piston one of these openings will alternately register with the sparking terminals of the poles of two spark plugs 65 and 66 which are mounted in spaced registered holes in the cylinder 18 and in the shell 41ª for exploding the fuel when compressed in one of the compression chambers and subsequently exploding the fuel when compressed in the other compression chamber during each upstroke and each downstroke of the piston.

In bearings 67 and 68 provided in the walls 12 and 13 of the crank pit and in spaced bearings 69 and 70 within the crank pit are journaled the divided members, as 71 and 72, of a drive shaft 73. On the end of the member 71 of the drive shaft exteriorly of the crank pit may be a balance wheel 74, and on the member 72 of the drive shaft also exteriorly of the crank pit may be a removable handle, as 75, to allow the engine to be cranked when desired. The ends of the members of the drive shaft 73 within the crank pit are in spaced alined relation, and serving as means to permit the shaft to be driven by the piston 42 of the engine, a crank, as 76, is provided. The crank 76 may be composed of two spaced bars, as 77 and 78, having their central parts held to the spaced ends of the members 71 and 72 of the drive shaft 73 within the crank pit 10, and the outer ends of the bars 77 and 78 of the crank 76 are connected by a short rod or stud 79 which is eccentrically disposed relative to the axial bearing of the drive shaft. On the other ends of the bars 77 and 78 of the crank 76 may be two counter weights, as 80 and 81, for preventing the drive shaft from unduly vibrating during its rotation. On the stud 79 of the bars 77 and 78 is rotatably held one end of an arm 82 having on its other end two spaced prongs or arms 83 and 84 arranged in substantially semi-circular shapes on a radius so that their free end parts are movably disposed through the openings 28 and 29 of the bottom member 22 of the cylinder 18. The prongs 83 and 84 are pivoted, at 85 and 86, to the extensions or lugs 44 and 45 of the wall 43 of the piston 42 so that with the cranking of the shaft 73 the bars 77 and 78, weights 80 and 81 and the stud 79 will be radially swung causing the arm 82 with the prongs 83 and 84 to be moved upwardly and downwardly for reciprocating the piston 42. The piston will then be driven, as above explained, by the intermittent firing of the fuel in the compression chambers of the engine. With the driving of the shaft 73 the valves 57 and 58 will be reciprocated by operating a mechanism, as 87.

The mechanism 87 may be of a suitable form, though the mechanism shown is composed of a crank shaft 88 having its ends journaled in the walls 12 and 13 of the crank pit 10 above the drive shaft 73, and this crank shaft has three spaced parts, as 89, 90, 91. Between the spaced ends of the parts 89 and 90 of the crank shaft 88 is provided a pin or stud 92 which is eccentrically arranged relative to the axial center of the shaft, and between the spaced ends of the parts 90 and 91 of the crank shaft is another pin of stud 93 which is also eccentrically disposed with relation to the axial center of the crank shaft as well as being positioned diametrically opposite to the stud 92. On the stud 92 is rotatably mounted one end of a crank arm or link 94 having its other end pivoted to the lower end of the valve 57, and on the stud 93 is rotatably mounted one end of a crank arm or link 95 having its other end pivoted to the lower end of the valve 58. A sprocket wheel 96 is held on the part 89 of the crank shaft 88, and on this wheel is a sprocket chain 97 which passes over a pulley 98 keyed on the drive shaft 73. These parts of the mechanism are proportioned relative to the parts of the drive shaft 73, that with the driving of the shaft 73 and reciprocation of the piston 42, as hereinbefore explained, the sprocket chain 97, wheel 96, crank shaft 88 and the links 94, 95 will be operated so that with each stroke of each of the valves 57 and 58 the inlet of one compression chamber and the outlet of the other compression chamber will be simultaneously opened and closed for admitting fuel into one chamber and discharging exploded fuel products from the other chamber.

Having reference to Figure 1 of the drawings I will assume that the combustible gases are compressed between the partition 46 and the upper cylinder 32. The piston having therefore reached the end of its upward compression stroke, the opening 64 allows communication between the upper part of the piston and a spark plug 66. The compressed gases are now ignited and the piston is driven downwardly.

During this downward stroke the port 61 allows the exhaust gases to pass from the lower part of the piston. At the end of this down stroke the port 61 closes and the port 60 comes in registration with port 56. On the next up stroke the port 59 registers 53 to allow the intake of gases into the lower part of the piston. At the same time gases are being expelled from the upper part of the piston through the port 56. On the next succeeding down stroke, ports 53 and 61 are closed and the gas within the lower part of the piston is compressed. During this stroke the port 51 comes into registration with the port 55 so that gases are drawn into the upper part of the piston.

When the opening 63 comes into registration with the cylinder opening for the spark plug 65 the gas in the lower part of the piston is ignited just after all of the valves have closed all of the inlet and outlet openings. This completes the cycle of operation of the engine.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In a double acting internal combustion engine, a crank case, a vertical cylinder having laterally disposed exhaust and intake ports in its vertical wall and mounted on said crank case, two of said ports opening into the upper end of said cylinder and two others opening into the lower end of said cylinder, said cylinder also being formed with horizontal passages in its wall, said passages being located oppositely from said intake and exhaust ports and adapted to receive spark plugs, a double acting piston arranged to reciprocate within said cylinder, a partition connecting the walls of said piston so as to divide it into an upper piston and a lower piston, opposite cylindrical extensions on said piston, each of said extensions having an elongated exhaust port and an elongated intake port adapted to register with the above mentioned exhaust and intake ports in the cylinder wall, each of said extensions having a circular opening opposite from the exhaust and intake ports, and means for so directing the movement of said piston that its circular opening shall, at times during its operation come into registration with the passages in the cylinder wall.

2. In an internal combustion engine, a cylinder having laterally disposed exhaust and intake ports in its vertical wall, two of said ports opening into the upper end of said cylinder, and two opening into the lower end of said cylinder, valve mechanism for controlling said ports, a piston working in said cylinder, opposite cylindrical extensions on said piston, each of said extensions having an elongated exhaust port and an elongated intake port adapted to register with the corresponding ports in the cylinder wall, each of said extensions having a circular opening in its wall opposite from said elongated openings, spark plugs arranged in openings in said cylinder wall, and means for so directing the movement of said piston that its circular openings shall, at times during its operation, come into registration with said spark plug openings.

3. In a double acting internal combustion engine, a crank case, a vertical cylinder block mounted above said crank case, a lower cylinder head disposed between said block and said crank case, said head having an upstanding cylindrical portion arranged within said block with its walls spaced therefrom, piston rings surrounding said cylindrical portion, an upper cylinder head similar in shape to said lower cylinder head being mounted on the top of said block with its cylindrical portion extending downwardly within said block, piston rings surrounding the cylindrical portion of said upper cylindrical head, flanges upon said blocks, at the top and bottom thereof, means passing through said flanges to secure said cylinder heads in position relative thereto, a piston with opposite cylinder extensions cooperating with said cylinder block to divide the block into upper and lower combustion chambers, one side of said block having circular openings formed therein, spark plugs mounted therein, each of said extensions of said piston having intake and exhaust openings therein corresponding in size and number to the spark plug openings in the cylinder block, the piston openings permitting communication between the spark plug openings and the combustion chambers at the proper times during the operation of the engine, elongated intake and exhaust ports in the wall of each extension of the piston opposite from the above mentioned piston openings, the wall of said block opposite from said spark plug openings having circular intake and exhaust ports to register with said elongated ports, and reciprocating plunger valves for controlling the opening and closing of said circular ports.

This specification signed and witnessed this 21st day of November A. D. 1921.

ARTHUR A. RIGNY.

Witnesses:
A. LEICHTER,
J. FREDERICK CRYER.